(12) United States Patent
Glimpel et al.

(10) Patent No.: US 8,272,817 B2
(45) Date of Patent: Sep. 25, 2012

(54) TOOL FOR MACHINING A WORKPIECE

(75) Inventors: Helmut Glimpel, Lauf (DE); Dietmar Hechtle, Pegnitz (DE)

(73) Assignee: Emuge-Werk Richard Glimpel GmbH & Co. KG Fabrik fur Prazisionswerkzeuge, Lauf (DE)

( * ) Notice: Subject to any disclaimer, the term of this patent is extended or adjusted under 35 U.S.C. 154(b) by 1353 days.

(21) Appl. No.: 11/852,867

(22) Filed: Sep. 10, 2007

(65) Prior Publication Data

US 2008/0069653 A1 Mar. 20, 2008

(30) Foreign Application Priority Data

Sep. 19, 2006 (DE) .......................... 10 2006 044 575

(51) Int. Cl.
*B23G 5/06* (2006.01)

(52) U.S. Cl. ........................................ 408/222; 408/215

(58) Field of Classification Search .................. 408/215, 408/222, 216, 219; 470/198; *B23G 5/06*
See application file for complete search history.

(56) References Cited

U.S. PATENT DOCUMENTS

| | | | |
|---|---|---|---|
| 2,202,236 A | | 5/1940 | Stimson |
| 3,328,814 A | * | 7/1967 | Hudson .......................... 408/220 |
| 4,708,542 A | * | 11/1987 | Emanuelli ...................... 408/144 |
| 5,562,371 A | * | 10/1996 | Reed ............................... 408/222 |
| 5,842,924 A | * | 12/1998 | Manos et al. ................... 470/198 |
| 6,012,882 A | * | 1/2000 | Turchan ........................... 409/74 |
| 6,503,252 B2 | * | 1/2003 | Hansson ........................... 606/65 |
| 7,144,208 B2 | * | 12/2006 | Henderer et al. ............. 408/144 |
| 7,553,114 B2 | * | 6/2009 | Oknestam et al. ............ 408/222 |

FOREIGN PATENT DOCUMENTS

| | | |
|---|---|---|
| DE | 416709 C | 7/1925 |
| DE | 2331927 A1 | 1/1975 |
| DE | 8324835 U | 12/1983 |
| DE | 8324835 U1 | 12/1983 |
| FR | 2350163 A1 | 12/1977 |
| FR | 2701226 A1 | 8/1994 |
| GB | 1090875 A1 | 11/1967 |
| JP | 01171725 A * | 7/1989 |
| JP | 2001353623 A1 | 12/2001 |
| RU | 2021085 C1 | 10/1994 |

OTHER PUBLICATIONS

"Mecano Speed-Nuts" Mecano-Simmonds GMBH, Germany, Catalog, 2nd Ed. 1969, pp. 29-7 and 29-1, 4 pages.

* cited by examiner

*Primary Examiner* — Eric A Gates (57) ABSTRACT

The invention relates to a tool for machining a workpiece, which tool is rotatable about a tool axis, having a tool shank and a tool head, which tool head comprises at least one land, at least one spiral point assigned to the land and at least one flute assigned to the land, wherein the flute has a left-hand helix and the spiral point is skewed to the left, or wherein the flute has a right-hand helix and the spiral point is skewed to the right.

26 Claims, 5 Drawing Sheets

FIG 10

TOOL FOR MACHINING A WORKPIECE

CROSS-REFERENCE TO RELATED APPLICATIONS

The present invention claims the benefit of priority to German Patent Application No. 10 2006 044 575.9, filed Sep. 19, 2006, having a translated title of "Tool for Machining a Workpiece," the entire contents of which are incorporated by reference herein.

BACKGROUND OF THE INVENTION

1. The Field of the Invention

The invention relates to a tool for machining a workpiece, which tool is rotatable about a tool axis, having a tool shank and a tool head.

2. Background and Relevant Art

The invention relates to a tool for machining a workpiece, which tool is rotatable about a tool axis, having a tool shank and a tool head. The tool head has at least one land, at least one spiral point and at least one flute.

Such a tool may be, for example, a tap, as described in DE 83 24 835 U1. The tap from DE 83 24 835 U1 has, in its shank part, three axially parallel dirt grooves which are arranged in a uniformly distributed manner over the periphery and between which webs having teeth are arranged. The tap is conically formed on the head side in its chamfer region by a section of the tips of the teeth. Arranged in this region are curling cutout grooves which merge with their rear ends into the straight dirt grooves and are oriented deeper towards the end face of the tap. As a result, webs which taper forwards and have a cutting edge are formed.

Such taps having a spiral point are especially suitable for cutting threads in through-holes. In this case, the chips are brought out in the cutting direction, such that said chips drop out of the drill hole and do not hinder the cutting process due to a build-up of chips.

BRIEF SUMMARY OF THE INVENTION

Implementations of the present invention include a tool configured to maximize the cutting capacity of the tool.

According to the invention, this is achieved by a tool for machining a workpiece, which tool is rotatable about a tool axis, having a tool shank and a tool head, which tool head comprises at least one land, at least one spiral point (or, curling chamfer) assigned to the land and extending essentially in the direction of the tool axis and at least one flute assigned to the land and extending essentially in the direction of the tool axis, wherein the flute has a left-hand helix and the spiral point is skewed to the left, or wherein the flute has a right-hand helix and the spiral point is skewed to the right. In this case, the spiral point merges into the flute. It has been found that a tool having a land, a spiral point and a flute which comprises a left-hand helix and whose associated spiral point is skewed to the left or which comprises a right-hand helix and whose spiral point is skewed to the right has good cutting properties. In particular if the tool is a tapping tool, a right-hand thread is machined if the flute comprises a left-hand helix and its associated spiral point is skewed to the left, or a left-hand thread is machined if the flute has a right-hand helix and its associated spiral point is skewed to the right.

Such a tool has a long service life and has in particular proved to be advantageous when machining through-holes in higher-strength steels and for machining through-holes at high speed, the tool being rotated about its tool axis. For example, the tool may be used for machining tempering steels, nitriding steels, hot-work steels, hardened steels, cold-work steels, case-hardening steels and/or alloyed steels, e.g. 42CrMo4V with a tensile strength $R_m$ of about 1000 N/mm$^2$ or C45 with a tensile strength $R_m$ of about 600 N/mm$^2$. The cutting speed $v_c$ is about 5 to 50 m/min, preferably 10 m/min, when machining 42CrMoV and about 10 to 100 m/min, preferably 20 m/min, when machining C45. The tool is therefore preferably operated within a cutting speed range of about 5 to 100 m/min.

Chips produced during the cutting process are brought out forwards from a through-hole by means of the spiral point. For "lost" chips, which do not move forward as desired but rather in the direction of the tool shank, the left-hand helixed flute serves for the axial chip disposal.

According to a variant of the invention, the helix angle of the left-hand helix or of the right-hand helix of the flute is between 2° and 15°, preferably 5 to 7°, with respect to the tool axis of the tool.

According to embodiments of the invention, the spiral point skew of the spiral point is between 5° and 20°, preferably 8° to 12°, and the spiral point inclination of the spiral point is between 3° and 15°, preferably 8° to 10°. The spiral point skew and the spiral point inclination are likewise specified with respect to the tool axis of the tool. The spiral point skew is skewed to the left or the right with respect to the tool axis.

The land of the tool comprises a crest. The rake angle of the crest relative to the spiral point or the flute with respect to the tangent to the cutting edge of the crest in the cutting direction is between +30° and −5°. The rake angle may vary between different embodiments of the tool. According to a variant of the invention, the rake angle of the crest varies in the direction of the tool shank starting from the end face of the tool head. In different embodiments of the tool, the rake angle may vary with respect to a specific measuring point on the tool. In different embodiments of the tool, therefore, the rake angle may vary differently in the direction of the tool shank starting from the end face of the tool head. The rake angle preferably varies continuously within the specified range of +30° to −5° from the end face of the tool head up to the end of the spiral point, both the initial value and the final value being variable. The rake angle may therefore vary, but need not necessarily vary. At the end of the spiral point, the rake angle according to a variant of the invention has an end value of between +30° and −5°, preferably between +15° and −5°.

The length of the spiral point of the tool extends between about one fifth (⅕) to three quarters (¾) of the length of the flute, i.e., if the flute were to be measured from the end face of the tool up to its end at the tool head, the spiral point extends over about one fifth to three quarters of the length of the flute starting from that end face of the tool at which the spiral point starts.

According to embodiments of the invention, the core diameter of the tool increases in the direction of the tool shank starting from the end face of the tool head. At the same time, the cross-sectional area of the land also increases in the direction of the tool shank starting from the end face of the tool head, the tooth width of the land preferably also increasing.

Variants of the invention provide for the tool to have a plurality of lands, for example three, four, five or more lands, and for the tool to be a tapping tool which has a helically running external thread. The external thread is in this case arranged on the lands or the crests of the lands, which are separated from one another by the spiral points and flutes. If the tool has a flute with a left-hand helix and a spiral point which is skewed to the left, this tool is preferably intended for producing right-hand threads. On the other hand, if the tool has a flute with a right-hand helix and a spiral point which is skewed to the right, this tool is preferably intended for producing left-hand threads.

According to a variant of the invention, the thread turns of the external thread are flattened in a first region of the tool head—the chamfer or chamfer region—starting from the end face of the tool head and there are full thread turns in a second region of the tool head adjoining the first region, where "full" refers to a thread turn without a flat, which thread turn can readily be interrupted by spiral points or flutes. The widening of the thread crest in the first region decreases towards the second region starting from the end face of the tool head.

According to an embodiment of the invention, the tool has a third region of thread turns of the tool head which adjoins the second region and in which the thread turns are likewise flattened. The widening of the thread crest in the third region increases in the direction of the tool shank starting from the second region.

There are preferably between one and ten full thread turns in the second region. The second region of the thread turns starts approximately in the region of the end of the spiral points, in which region there are preferably three to nine thread crests, which, as already mentioned, are widened. The second region adjoins the chamfer.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
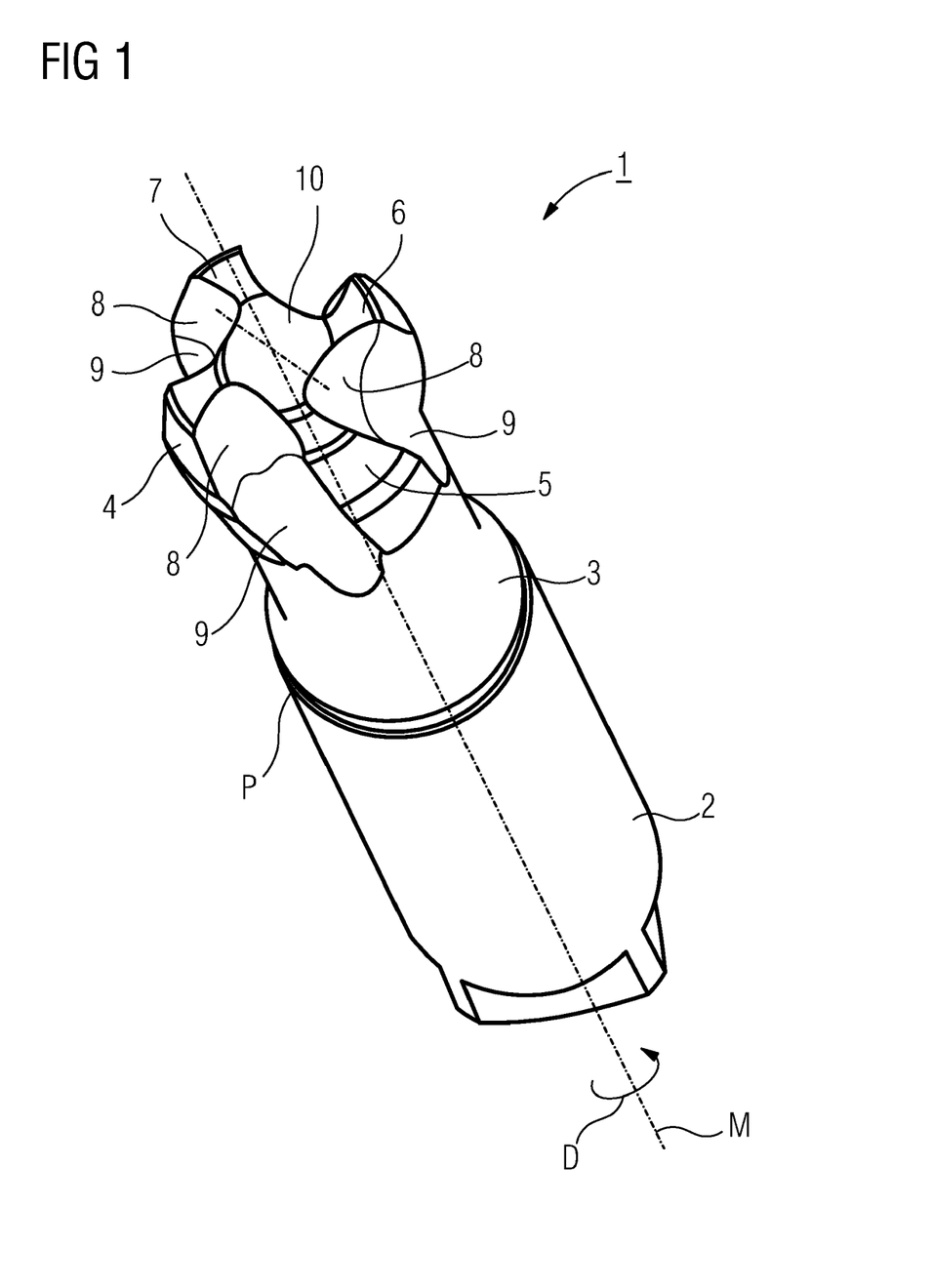
FIG. 1 shows a tapping tool according to the invention in a perspective illustration.

A tool according to an implementation of the invention for machining a workpiece is shown in FIG. 1, said tool being a tapping tool 1 in the case of the present exemplary embodiment. The tapping tool 1 comprises a tool shank 2 for clamping in a machine tool and a tool head 3. The tool shank 2 merges into the tool head 3 via a bevel P. The tapping tool 1 comprises a tool axis in the form of a centre axis M, about which the tapping tool 1 can be rotated.

In the case of the present exemplary embodiment, at the tool head 3 of the tapping tool 1, four lands 4 to 7 are arranged around the centre axis M, said lands 4 to 7 being provided with an external thread, which, however, is not depicted in FIG. 1. The external thread of the lands 4 to 7, which extends helically along the tool head 3, can be seen in FIGS. 2 and 3, which show part of the tool head 3 of the tapping tool 1 from FIG. 1. As can be seen in particular from FIGS. 1 and 2, there is a respective spiral point 8 between two successive crests of the lands 4 to 7 at the end face of the tool head 3, and a flute 9 adjoins the spiral point 8. Apart from that, in the present exemplary embodiment, the tapping tool 1 has a centre point 10 on the end face.

The tapping tool 1 is designed according to the invention in such a way that the flutes 9 or the lands 4 to 7 have a left-hand helix with respect to the tool centre axis M. The helix angle $\gamma$ of a flute 9 is depicted by way of example in FIG. 3. In the tapping tool 1, the helix angle $\gamma$ of a flute 9 may be between 2° and 15° and is specified with respect to the centre axis M of the tapping tool 1. The helix angle $\gamma$ is preferably about 5° to 7°. In the case of the present exemplary embodiment, the helix angle $\gamma$ is selected to be identical at all the flutes 9.

Furthermore, in the case of the present exemplary embodiment, the tapping tool 1 is designed in such a way that the spiral points 8 each have a spiral point skew or a spiral point angle $\gamma_A$ of between 5° and 20°, preferably about 8° to 12°, with respect to the centre axis M of the tapping tool 1. In the case of the present exemplary embodiment, the spiral point skew $\gamma_A$ is selected to be identical at all the spiral points 8 and is likewise specified with respect to the centre axis M of the tapping tool 1 (cf. FIG. 3). In the case of the present exemplary embodiment, the spiral point skew is skewed to the left in interaction with a flute 9 having a left-hand helix. The tapping tool is preferably intended for producing right-hand threads.

Figure 4:
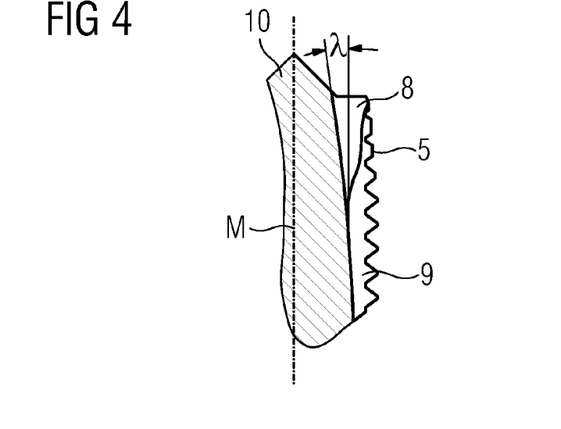
FIG. 4 shows part of the tapping tool from FIG. 1 in a sectional illustration.

The spiral point inclination $\lambda$ of each of the spiral points 8 is between 3° and 15° relative to the centre axis M of the tapping tool 1. For a detail of a section through the tapping tool 1 from FIG. 1, the spiral point inclination $\lambda$ of a spiral point 8 with respect to the centre axis M is shown by way of example in FIG. 4. The spiral point inclination $\lambda$ is in this case the inclination of the core of the spiral point 8 relative to the centre axis M of the tapping tool 1, which spiral point 8 merges into a flute 9. In the case of the present exemplary embodiment, the spiral point inclination $\lambda$ is about 8° to 10°.

Figure 2:
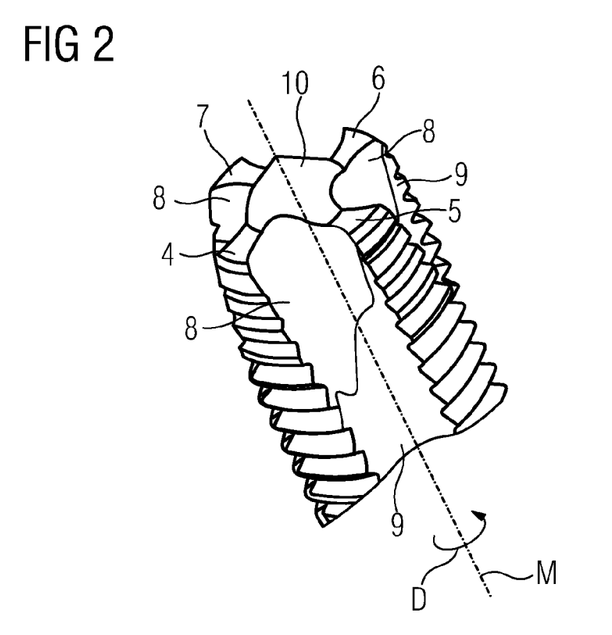
FIG. 2 shows a section of the tapping tool from FIG. 1 in a perspective illustration.
Figure 3:
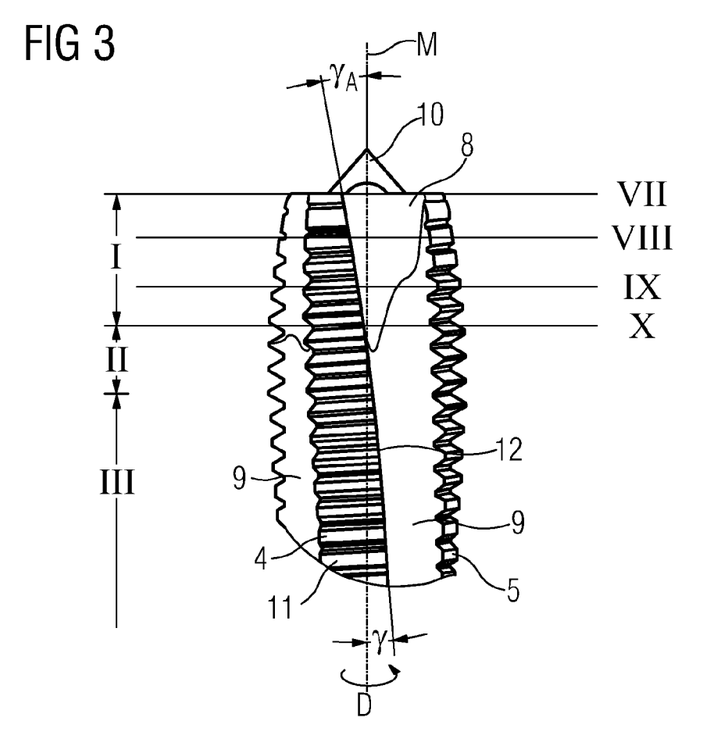
FIG. 3 shows a section of the tapping tool from FIG. 1 in a side view.

A spiral point 8 preferably extends over about one fifth to three quarters of the length of a flute 9, a factor which can be seen from FIGS. 1 to 3.

In addition, in the case of the present exemplary embodiment, the tapping tool 1 has along its tool head 3 various cutting regions provided with the external thread, which are depicted in FIG. 3. In the first cutting region, identified by I, of the tapping tool 1, the "chamfer", the thread crests of the external thread are widened starting from the end face of the tool head 3, the widening of the thread crest in the first region I decreasing starting from the end face of the tool head 3 to the second region II. This results in a conical configuration of the region I of the tapping tool 1. In the case of the present exemplary embodiment, the tapping tool 1 has six thread crests, which are more or less widened, in the first region I, which essentially corresponds to the region of the spiral point 8.

Adjoining the first region I is a second region II of thread crests of the external thread, the thread crests arranged in the second region II being full thread crests, that is to say thread crests without widening of the external thread of the tapping tool 1. In the case of the present exemplary embodiment, three full thread crests of the external thread are arranged in the second region II. Finally, adjoining the second region II is a third region III, in which, starting from the second region II, the thread crests are widened again in the direction of the tool shank 2 of the tapping tool 1, the widening increasing in the direction of the tool shank 2 starting from the second region II. That region of the tool head 3 which adjoins the third region III is therefore smaller in maximum diameter than the second region II.

As can be seen in particular from FIGS. 1 to 3, the thread crests of the tool head 3 are interrupted by the spiral points 8 and flutes 9.

Figure 7:
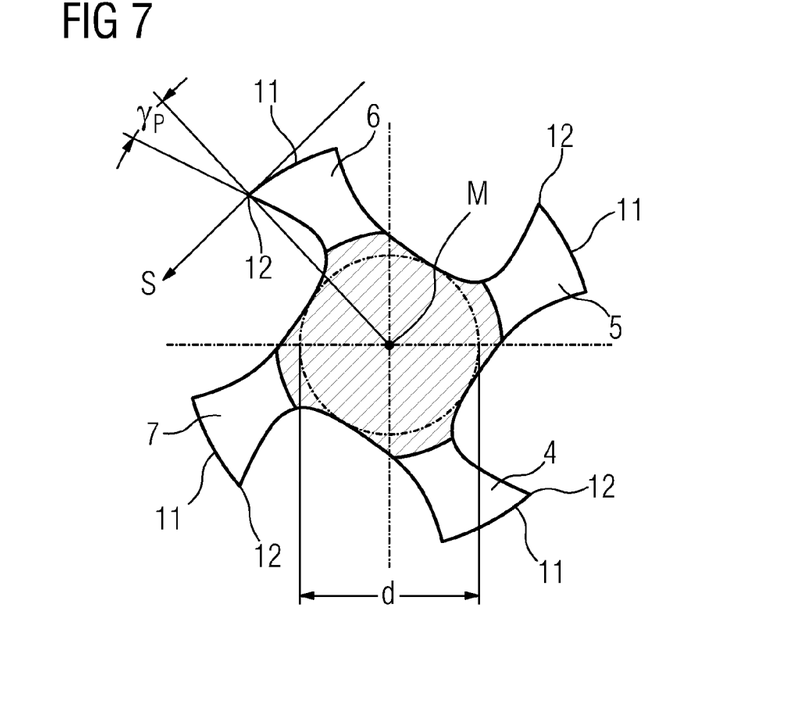
FIG. 7 to FIG. 10 show various cross-sectional illustrations of the tapping tool from FIG. 1 along the section lines depicted in FIG. 3.
Figure 10:
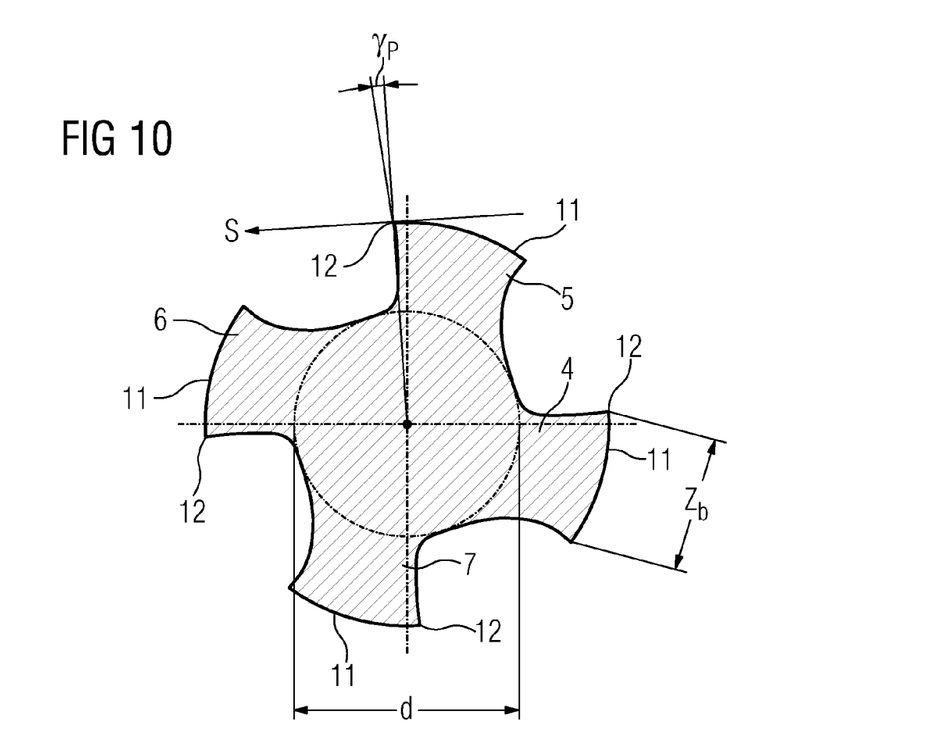

Furthermore, in order to explain the structure of the tapping tool 1, four sections VII to X are depicted in FIG. 3, the sectional views of which are shown in FIGS. 7 to 10. Firstly, it can be seen from the sectional views VII to X that, in the tapping tool 1, in the case of the present exemplary embodiment, the rake angle $\gamma_P$ of the crests 11 of the lands 4 to 7 preferably varies continuously in the direction of the tool shank 2 starting from the end face of the tool head 3. The rake angle $\gamma_P$ in this case is approximately identical at all the crests 11 of the lands 4 to 7 in one cross section. The rake angle $\gamma_P$, which is specified in each case with respect to a peripheral cutting edge 12 or a tangent in the cutting direction S to the peripheral cutting edge 12 of one of the crests 11 of the lands 4 to 7, can vary from +30° down to −5° at the end of a spiral point 8, starting from the end face of the tool head 3, a factor which is shown in FIG. 7. However, this latter configuration of the rake angle $\gamma_P$ is not shown in the figures. In FIG. 10, for the present exemplary embodiment, a last small positive rake angle $\gamma_P$ is depicted by way of example at the peripheral cutting edge 12 of the land 5.

As can be seen from FIGS. 7 to 10, the core diameter d of the tapping tool 1 increases in the direction of the tool shank 2 starting from the end face of the tool head 3. This can be seen both from FIG. 7, in which the relevant core diameter d and, indicated with an enlarged circle, the increasing core diameter d are depicted, and from FIGS. 8 to 10 as well as from FIG. 6, which shows a plan view of the tapping tool 1.

Figure 8:
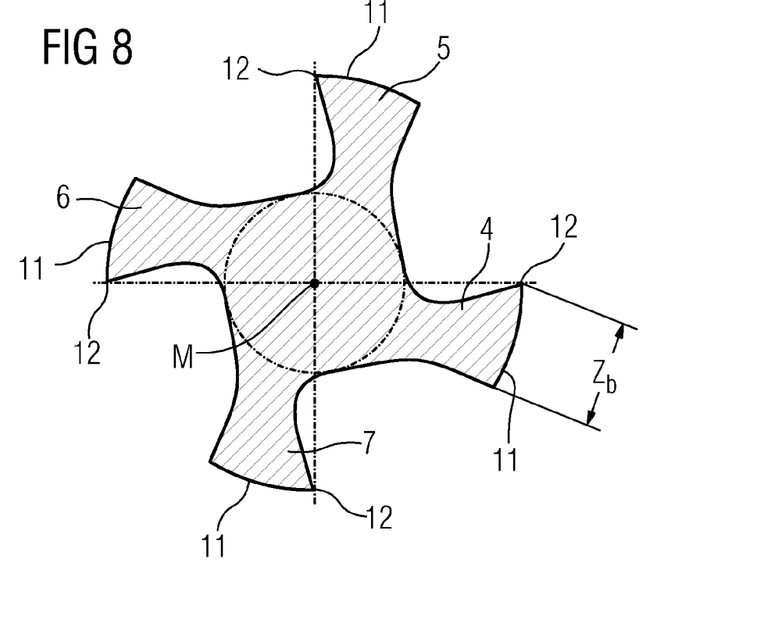
Figure 9:
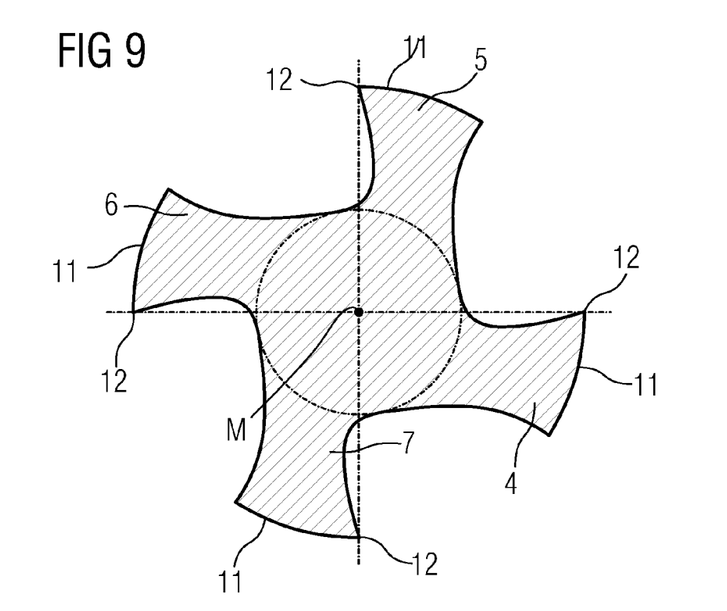

Starting from the end face of the tool head 3, the cross-sectional area of each land 4 to 7 also increases in the direction of the tool shank 2, wherein the land width or tooth width $Z_b$ of each land 4 to 7 also increases. Depicted by way of example in FIG. 8 and FIG. 10 is the tooth width $Z_b$ for the land 4. The cross-sectional areas of the lands 4 to 7 and the tooth widths $Z_b$ of the lands 4 to 7 are in this case approximately identical for all lands 4 to 7 in one cross section.

Figure 5:
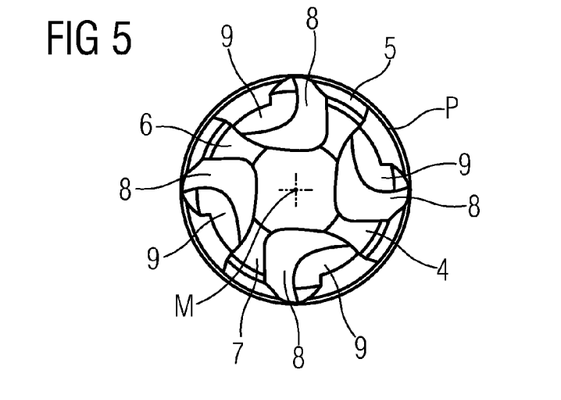
FIG. 5 and FIG. 6 show plan views of the tapping tool from FIG. 1.
Figure 6:
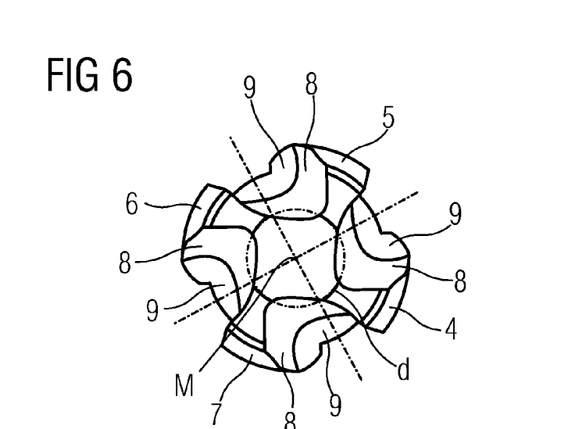

The above-described configuration of the tapping tool 1 can also be seen from the plan views as shown in FIGS. 5 and 6, the external threads of the lands 4 to 7 also being shown diagrammatically in FIG. 5, this being dispensed with in FIG. 6 compared with FIG. 5.

On account of its structure, the above-described tapping tool 1 is especially suitable for machining through-holes made of higher-strength steels or for machining through-holes at high speed. In this case, the chips produced by the thread crests of the external thread of the tapping tool 1 during the machining of a through-hole are brought out forwards, i.e. out of the through-hole. For "lost" chips, that is to say chips which do not move forwards, the flutes 9 provided with a left-hand helix are provided for the disposal of the chips.

The above-described structure of a tool according to the invention, in particular of a tapping tool according to the invention, should only be understood by way of example and may also be designed differently within the scope of the invention. Thus, the tapping tool may have less than four lands, but may also have more than four lands. In particular, the tapping tool may have three or five lands. The lands may be arranged with equal or with unequal pitch around the centre axis M. The specifications of the helix angle of the flutes, of the spiral point skew and of the rake angles relate in this case to the respective peripheral cutting edge of a land, all the lands being of essentially identical design.

In contrast to the exemplary embodiment described, the tool may also have one or more flutes with a right-hand helix to which a spiral point or spiral points are assigned which are designed to skew to the right. A tapping tool of such a design is preferably intended for producing left-hand threads.

Apart from that, angular settings different from those described above in connection with the present exemplary embodiment, for example for the helix angle, the spiral point skew, the spiral point inclination and/or the rake angle, can be selected within the scope of the invention.

The same applies to the number of thread crests in the regions I to III and for the selection of the length of the spiral point. The tapping tool also need not necessarily have three regions I to III of this kind, as described above.

The dimensioning of the tapping tools per se is selected in each case, as a function of the workpieces to be machined or of the through-holes to be machined. The thread profile angles in this case are preferably between 50° and 70° and the thread flank angles between 25° and 35°.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF DESIGNATIONS

| | |
|---|---|
| 1 | Tapping tool |
| 2 | Tool shank |
| 3 | Tool head |
| 4 to 7 | Lands |
| 8 | Spiral Point |
| 9 | Flute |
| 10 | Centre point |
| 11 | Crest |
| 12 | Peripheral cutting edge |
| $\gamma$ | Helix angle |
| $\gamma_A$ | Spiral point skew |
| $\lambda$ | Spiral point inclination |
| $\gamma_P$ | Rake angle |
| d | Core diameter |
| $Z_b$ | Tooth width |
| M | Centre axis |
| S | Cutting direction |
| P | Bevel |
| D | Direction of rotation |
| I to III | Regions |
| VII to X | Sections |

We claim:

1. A tool for machining a workpiece, which tool is rotatable about a tool axis, having a tool shank and a tool head, which tool head comprises at least one land, at least one spiral point assigned to the land and at least one flute assigned to the land, wherein the flute has a left-hand helix and the spiral point is skewed to the left, or wherein the flute has a right-hand helix and the spiral point is skewed to the right;
   wherein a helix angle of the left-hand helix or of the right-hand helix of the flute is between 2° and 15°;
   wherein the spiral point has a spiral point skew of between 5° and 20° skewed to the left or the right;
   wherein the spiral point has a spiral point inclination of between 3° and 15°;
   wherein the land comprises a crest which has a rake angle which is between +30° and −5°; and
   wherein the rake angle at the end of the spiral point is between +30° and −5°.

2. The tool according to claim 1, wherein the spiral point extends between about one fifth to three quarters of a length of the flute.

3. The tool according to claim 1, wherein a core diameter increases in a direction of the tool shank starting from the end face of the tool head.

4. The tool according to claim 1, wherein a cross-sectional area of the land increases in a direction of the tool shank starting from an end face of the tool head.

5. The tool according to claim 1, wherein there are between one and ten full thread crests in a second region.

6. The tool according to claim 1, wherein a second region of thread crests starts in a region of the end of the spiral point.

7. The tool according to claim 1, wherein the land comprises a crest which has a rake angle which varies in a direction of the tool shank starting from an end face of the tool head.

8. The tool according to claim 1, wherein a rake angle varies continuously in a direction of the tool shank starting from an end face of the tool head.

9. A tool for machining a workpiece, which tool is rotatable about a tool axis, having a tool shank and a tool head, which tool head comprises at least one land, at least one spiral point assigned to the land and at least one flute assigned to the land, wherein the flute has a left-hand helix and the spiral point is skewed to the left, or wherein the flute has a right-hand helix and the spiral point is skewed to the right;
   wherein a helix angle of the left-hand helix or of the right-hand helix of the flute is between 2° and 15°;
   wherein the spiral point has a spiral point skew of between 5° and 20° skewed to the left or the right;
   wherein the spiral point has a spiral point inclination of between 3° and 15°;
   wherein the tool is a tapping tool;
   wherein the tool has a helically running external thread;
   wherein thread crests of the external thread are widened in a first region starting from an end face of the tool head and there are full thread crests in a second region adjoining the first region;
   wherein the widening of the thread crest in the first region decreases towards the second region starting from the end face of the tool head;
   wherein the tool has a third region of thread crest which adjoins the second region and in which the thread crests are widened; and
   wherein the widening of the thread crest in the third region increases in a direction of the tool shank starting from the second region.

10. The tool according to claim 9, wherein the spiral point extends between about one fifth to three quarters of a length of the flute.

11. The tool according to claim 9, wherein a core diameter increases in the direction of the tool shank starting from the end face of the tool head.

12. The tool according to claim 9, wherein a cross-sectional area of the land increases in the direction of the tool shank starting from the end face of the tool head.

13. The tool according to claim 9, wherein there are between one and ten full thread crests in the second region.

14. The tool according to claim 9, wherein the second region of the thread crests starts in a region of the end of the spiral point.

15. The tool according to claim 9, wherein there are three to nine thread crests in a region of the spiral point.

16. The tool according to claim 9, wherein the land comprises a crest which has a rake angle which varies in the direction of the tool shank starting from the end face of the tool head.

17. The tool according to claim 9, wherein a rake angle varies continuously in the direction of the tool shank starting from the end face of the tool head.

18. A tool for machining a workpiece, which tool is rotatable about a tool axis, having a tool shank and a tool head, which tool head comprises at least one land, at least one spiral point assigned to the land and at least one flute assigned to the land, wherein the flute has a left-hand helix and the spiral point is skewed to the left, or wherein the flute has a right-hand helix and the spiral point is skewed to the right;
   wherein a helix angle of the left-hand helix or of the right-hand helix of the flute is between 5° and 7°;
   wherein the spiral point has a spiral point skew of between 8° and 12° skewed to the left or the right;
   wherein the spiral point has a spiral point inclination of between 8° and 10°;
   wherein the land comprises a crest which has a rake angle which is between +30° and −5°;
   wherein the rake angle at the end of the spiral point is between +30° and −5°;
   wherein the tool is a tapping tool;
   wherein the tool has a helically running external thread;
   wherein the thread crests of the external thread are widened in a first region starting from an end face of the tool head and there are full thread crests in a second region adjoining the first region;
   wherein the widening of the thread crest in the first region decreases towards a second region starting from the end face of the tool head;
   wherein the tool has a third region of thread crest which adjoins the second region and in which the thread crests are widened;
   wherein the widening of the thread crest in the third region increases in a direction of the tool shank starting from the second region.

19. The tool according to claim 18, wherein the spiral point extends between about one fifth to three quarters of a length of the flute.

20. The tool according to claim 18, wherein a core diameter increases in the direction of the tool shank starting from the end face of the tool head.

21. The tool according to claim 18, wherein a cross-sectional area of the land increases in the direction of the tool shank starting from the end face of the tool head.

22. The tool according to claim 18, wherein there are between one and ten full thread crests in the second region.

23. The tool according to claim 18, wherein the second region of the thread crests starts in a region of the end of the spiral point.

24. The tool according to claim 18, wherein there are three to nine thread crests in a region of the spiral point.

25. The tool according to claim 18, wherein the land comprises a crest which has a rake angle which varies in the direction of the tool shank starting from the end face of the tool head.

26. The tool according to claim 18, wherein a rake angle varies continuously in the direction of the tool shank starting from the end face of the tool head.

* * * * *